United States Patent
Won et al.

(10) Patent No.: US 6,542,687 B2
(45) Date of Patent: Apr. 1, 2003

(54) REDUCING POLARIZATION DEPENDENT LOSS CAUSED BY POLARIZATION DEPENDENT WAVELENGTH SHIFT USING CORE OVER-ETCH FOR PLANAR LIGHTWAVE CIRCUIT FABRICATION

(75) Inventors: Jongik Won, Pleasanton, CA (US); Fan Zhong, Fremont, CA (US); Farnaz Parhami, Fremont, CA (US); Nizar S. Kheraj, San Jose, CA (US)

(73) Assignee: Lightwave Microsystems, Inc., San Jose, CA (US)

( * ) Notice: Subject to any disclaimer, the term of this patent is extended or adjusted under 35 U.S.C. 154(b) by 0 days.

(21) Appl. No.: 09/873,068

(22) Filed: May 31, 2001

(65) Prior Publication Data

US 2002/0181916 A1 Dec. 5, 2002

(51) Int. Cl.$^7$ .................................................. G02B 6/10
(52) U.S. Cl. ...................... 385/132; 385/123; 385/124; 385/130; 385/131
(58) Field of Search ................................. 385/123–132

(56) References Cited

U.S. PATENT DOCUMENTS

| | | | |
|---|---|---|---|
| 5,467,415 A | * 11/1995 | Presby | ........................ 385/129 |
| 5,923,472 A | * 7/1999 | Bergmann | .................... 359/618 |
| 6,366,730 B1 | * 4/2002 | Cappuzzo et al. | ............. 216/24 |
| 6,370,306 B1 | * 4/2002 | Sato et al. | ..................... 385/12 |
| 6,374,016 B2 | * 4/2002 | Albert et al. | ................. 385/11 |

* cited by examiner

Primary Examiner—Robert H. Kim
Assistant Examiner—Richard Kim
(74) Attorney, Agent, or Firm—Wagner Murabito & Hao LLP

(57) ABSTRACT

A method of making a polarization insensitive optical waveguide structure. An optical core layer is formed on a substrate, wherein the optical core layer has a higher refractive index than the substrate. A mask is formed over the optical core layer. The unmasked areas of the optical core layer are then over-etched to define the core, wherein the over-etching removes the unmasked area of the optical core layer and a portion of the substrate disposed beneath the unmasked area, and defines the optical core. The mask is subsequently removed from the optical core. A cladding layer is then formed over the optical core and the substrate, the cladding layer having a lower refractive index than the optical core, to form a polarization insensitive optical waveguide structure. The amount of over-etching can be controlled to control an amount of substrate disposed beneath the unmasked area of the optical core layer that is removed. The amount of substrate removed, in turn, controls the polarization sensitivity of the optical waveguide structure. The amount of the portion of the substrate removed during the over-etching can be determined to minimize the polarization dependent wavelength shift and the polarization dependent loss of the optical waveguide structure. The amount of the portion of the substrate removed during the over-etching can be determined in accordance with a blanket stress of the cladding layer. The over-etching can be within a range between 7.5 percent and 30 percent.

18 Claims, 8 Drawing Sheets

Planer Optical Waveguide

PDW Improvement due to over-etch

US 6,542,687 B2

REDUCING POLARIZATION DEPENDENT LOSS CAUSED BY POLARIZATION DEPENDENT WAVELENGTH SHIFT USING CORE OVER-ETCH FOR PLANAR LIGHTWAVE CIRCUIT FABRICATION

FIELD OF THE INVENTION

The present invention relates generally to planar lightwave circuits. More particularly, the present invention relates to a method and system for a reduced polarization dependent wavelength shift/polarization dependent loss of planar lightwave circuit.

BACKGROUND OF THE INVENTION

Planar lightwave circuits comprise fundamental building blocks for the newly emerging, modern fiberoptic communications infrastructure. Planar lightwave circuits are innovative devices configured to transmit light in a manner analogous to the transmission of electrical currents in printed circuit boards and integrated circuit devices. Examples include arrayed waveguide grating devices, integrated wavelength multiplexers/demultiplexers, optical switches, optical modulators, wavelength-independent optical couplers, and the like.

Planar lightwave circuits generally involve the provisioning of a series of embedded optical waveguides upon a semiconductor substrate (e.g.,silicon), with the optical waveguides fabricated from one or more silica glass substrate layers, formed on an underlying semiconductor substrate. Fabrication techniques required for manufacturing planar lightwave circuits using silica glass substrates is a newly emerging field. Electronic integrated circuit type (e.g., CMOS) semiconductor manufacturing techniques have been extensively developed to aggressively address the increasing need for integration in, for example, the computer industry. This technology base is currently being used to make planar light circuits (PLCs). By using manufacturing techniques closely related to those employed for silicon integrtated circuits, a variety of optical circuit elements can be placed and interconnected on the surface of a silicon wafer or similar substrate. This technology has only recently emerged and is advancing rapidly with leverage from more mature tools of the simiconductor-processing industry.

A PLC optical waveguide comprises a silica glass substrate, at least one core waveguide formed thereon, and a cladding layer covering the core waveguide, wherein a certain amount of at least one dopant is added to both the core waveguide and the cladding layer so that the refractive index of the core waveguide is higher than that of the cladding layer. Fabrication of conventional optical waveguides involves the formation of a silica glass substrate, usually upon a silicon semiconductor wafer. A doped $SiO_2$ glass layer is deposited and is fabricated (e.g., with lithography processes) into a waveguide core, wherein a mask is formed on the doped $SiO_2$ glass layer. The waveguide core is patterned on the substrate typically by reactive-ion etching to remove the excess doped $SiO_2$ glass. The substrate is subsequently heated to an anneal temperature to stabilize the refractive index of the waveguide core. A $SiO_2$ cladding layer is then formed. Finally, the wafer is cut into multiple planar lightwave circuit dies and packaged according to their particular applications.

Prior art FIG. 1 shows a cross-section view of a conventional planar optical waveguide fabricated using a silica glass substrate. As depicted in FIG. 1, the planar optical waveguide includes a doped $SiO_2$ glass core 10 formed over a $SiO_2$ silica glass substrate 12. A $SiO_2$ cladding layer 11 covers both the core 10 and the substrate 12. As described above, the refractive index of the core 10 is higher than that of the cladding layer 11 and the substrate 12. Consequently, optical signals are confined axially within core 10 and propagate lengthwise through core 10.

A well-known problem with many planar lightwave circuits is the polarization sensitivity of the device. For example, with arrayed waveguide grating (AWG) devices, integrated wavelength multiplexers/demultiplexers, and the like, due to the fact that an optical signal propagating through an optical fiber has an indeterminate polarization state, the switching/routing devices must be substantially polarization insensitive. However, due to stress imposed upon a silica substrates (e.g., from the fabrication process) and other factors, planar waveguides usually have different propagation constants for TE (transverse electric) and TM (transverse magnetic) propagation modes. For AWG devices, this difference in propagation constants results in a wavelength shift in the spectral response peak or the passband of each wavelength channel. This wavelength shift is sensitive to the design of the planar waveguide, and can be 3 nm or larger. As wavelength division multiplexing progress towards smaller and smaller channel spacing dimensions (from 1.6 nm to 0.8 nm or even less), even a small polarization dependent wavelength shift (e.g. 0.3–0.4 nm) is potentially troublesome.

Polarization dependent wavelength shifts causes mismatches in the propagation constants for TE and TM modes. This mismatch causes a polarization dependent loss, wherein either the TE or TM mode is attenuated within the optical waveguide structures to a greater degree than the other. The wavelength shift between TE and TM and the different losses experienced causes significant signal degradation. Thus, the polarization dependent wavelength shift and the polarization dependent loss characteristics of a planar lightwave circuit, particularly a dense WDM device (e.g., an AWG multiplexer or demultiplexer), is an important measure of the device's performance.

Prior art FIG. 2 shows a graph depicting polarization dependent wavelength shift and polarization dependent loss for TE and TM propagation modes. As depicted in FIG. 2, a TE signal component and a TM signal component are graphed after having experienced phase dependent wavelength shift (PDW) and phase dependent loss (PDL), from, for example, propagation along the core 10 of the planar optical waveguide of FIG. 1. The vertical axis of the graph shows insertion loss in decibels and the horizontal axis shows wavelength. As described above, the difference in propagation constants for the TE and TM signal components results in a PDW wavelength shift 21 in the spectral response peak between the TE and TM signal components. This wavelength shift in turn causes a PDL loss 22.

Thus what is required is a solution that matches the TE and TM propagation modes of an optical signal within a planar lightwave circuit. What is required is a solution that minimizes polarization dependent wavelength shift within a planar lightwave circuit. What is further required is a solution that minimizes polarization dependent loss within a planar lightwave circuit. The required solution should significantly increase the performance of polarization sensitive optical waveguide devices. The present invention provides a novel solution to the above requirements.

SUMMARY OF THE INVENTION

The present invention provides a solution that matches the TE and TM propagation modes of an optical signal within a planar lightwave circuit. The present invention provides a solution that minimizes polarization dependent wavelength shift within a planar lightwave circuit. Additionally, the solution of the present invention minimizes polarization dependent loss within a planar lightwave circuit and significantly increases the performance of high-precision optical devices such as AWG demultiplexers/multiplexers.

In one embodiment, the present invention comprises an optical core layer over-etch process for making a polarization insensitive optical waveguide structure. An optical core layer is formed on a substrate, wherein the optical core layer has a higher refractive index than the substrate. A mask is then formed over the optical core layer. The unmasked areas of the optical core layer are then over-etched to define the core, wherein the over-etching removes the unmasked area of the optical core layer and a portion of the substrate disposed beneath the unmasked area, along with defining the optical core. The mask is subsequently removed from the optical core. A cladding layer is then formed over the optical core and the substrate, the cladding layer having a lower refractive index than the optical core. The cladding layer, the optical core, and the substrate fabricated in this manner together form a polarization insensitive optical waveguide structure.

The amount of over-etching can be controlled in order to control an amount of substrate disposed beneath the unmasked area of the optical core layer that is removed. The amount of substrate removed, in turn, controls the polarization sensitivity of the optical waveguide structure. The amount of the portion of the substrate removed during the over-etching can be determined to minimize the polarization dependent wavelength shift and the polarization dependent loss of the optical waveguide structure (e.g., via computer simulations, empirical tests, etc.). The amount of the portion of the substrate removed during the over-etching can be determined in accordance with a blanket stress of the cladding layer. The over-etching can be within a range between 7.5 percent and 30 percent depending on manufacturing process of planar lightwave circuits such as AWG.

In this manner, the controlled percentage of over-etch matches the TE and TM propagation modes of an optical signal within the optical waveguide structure. The matching of the TE and TM signal components minimizes polarization dependent wavelength shift polarization dependent loss within a planar lightwave circuit.

BRIEF DESCRIPTION OF THE DRAWINGS

The present invention is illustrated by way of example and not by way of limitation, in the Figures of the accompanying drawings and in which like reference numerals refer to similar elements and in which.

Prior art

Prior art

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

Embodiments of the present invention are directed towards an optical core layer over-etch optical waveguide structure fabrication process that matches the TE and TM propagation modes of an optical signal within a planar lightwave circuit. The present invention provides a solution that minimizes polarization dependent wavelength shift within a planar lightwave circuit. Additionally, the solution of the present invention minimizes polarization dependent loss within a planar lightwave circuit and significantly increases the performance of high-precision optical devices such as AWG demultiplexers/multiplexers. The present invention and its benefits are further described below.

Figure 1:
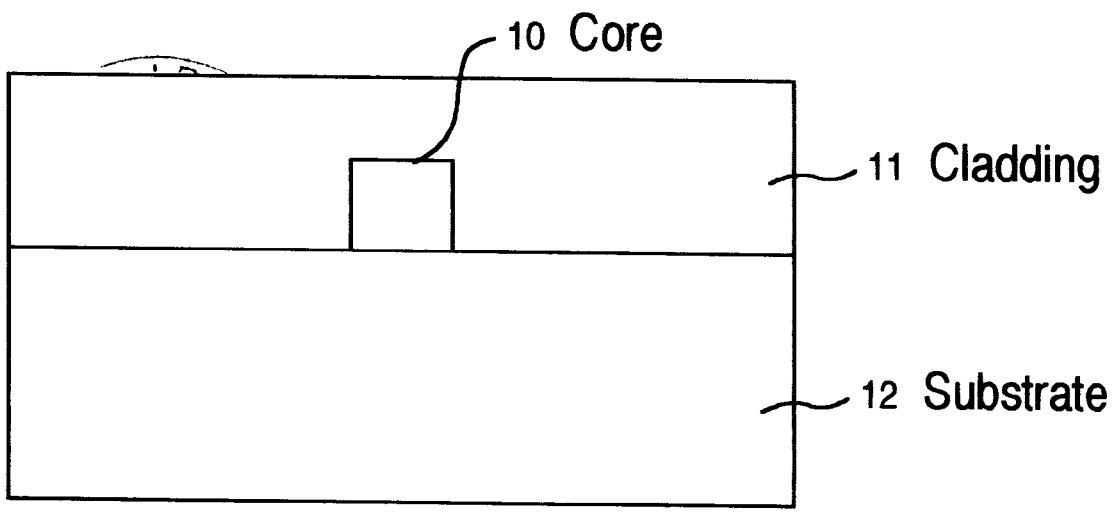
FIG. 1 shows a cross-section view of a conventional planar optical waveguide fabricated using a silica glass substrate.
Figure 2:
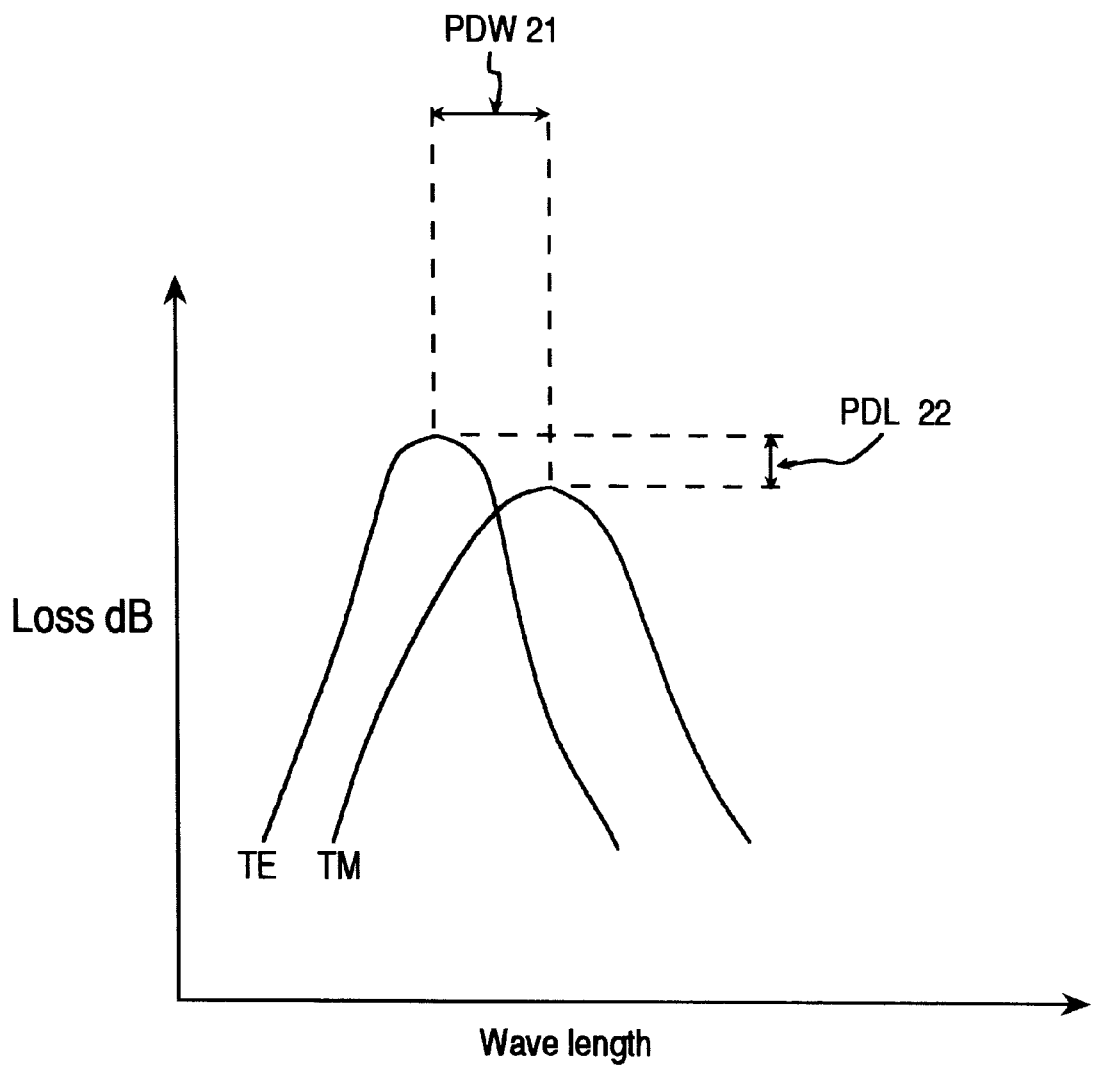
FIG. 2 shows a graph depicting polarization dependent wavelength shift and polarization dependent loss for TE and TM propagation modes within a conventional optical planar waveguide.
Figure 3:
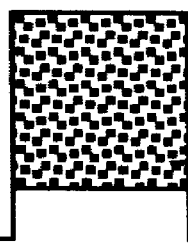
FIG. 3 shows a cross-section view of an optical waveguide structure fabricated in accordance with an optical core layer over-etch process of the present invention.

FIG. 3 shows a cross-section view of an optical waveguide structure 300 fabricated in accordance with an optical core layer over-etch process of the present invention. As depicted in FIG. 3, optical waveguide structure 300 is shown in a state subsequent to over-etching to remove a core layer used to form core 310 and over-etch a portion of bottom clad layer 312. The amount of over-etch is indicated by line 301.

In accordance with one embodiment of the present invention, the core layer over-etch process is used for making a polarization insensitive optical waveguide structure. The major steps of silicon oxide deposition, photolithography, and fabrication are well known and widely used in planar lightwave circuit fabrication. Accordingly, such steps will not be described in extensive detail.

Referring still FIG. 3, an optical core layer is formed on a substrate, in this case, bottom clad 312, wherein the optical core layer has a higher refractive index than bottom clad 312. Bottom clad layer 312 can be a silicon dioxide layer formed over a silicon substrate (not shown). The optical core layer can be a doped $SiO_2$ glass layer, as is known in the art. A mask (not shown) is then formed over the optical core layer using well-known photolithography techniques. The unmasked areas of the optical core layer are then over-etched to define the core 310, wherein the over-etching removes the unmasked area of the optical core layer (e.g., the layer from which core 310 was formed) and a portion of the substrate (e.g., bottom clad 312) disposed beneath the unmasked area. The over-etching defines the dimensions of optical core 310, as shown in FIG. 3. The mask is subsequently removed from the optical core, such that the optical waveguide structure 300 appears as shown in FIG. 3.

Thus, the over-etching removes a portion of bottom clad 312 which is not directly beneath core 310. This amount is indicated by line 301, showing the over-etch portion. The amount of over-etching can be controlled in order to control an amount of substrate disposed beneath the unmasked area of the optical core layer that is removed. The amount of substrate removed, in turn, controls the polarization sensitivity of the optical waveguide structure 300. The amount of the portion of the substrate removed during the over-etching (e.g., over-etch portion 301) can be determined to minimizes the polarization dependent wavelength shift and the polarization dependent loss of the optical waveguide structure. For example, the amount of the portion of the substrate removed during the over-etching can be determined in accordance with a blanket stress of the cladding layer. The over-etching is preferably within a range between 7.5 percent and 30 percent over-etch. Percentage over-etch is defined by the relationship ((etched depth from the surface)-(core layer thickness))/ (core layer thickness).

The controlled percentage of over-etch (e.g., over its portion 301) matches the TE and TM propagation modes of an optical signal within the optical waveguide structure 300. The matching of the TE and TM signal components minimizes polarization dependent wavelength shift polarization dependent loss within a planar lightwave circuit.

Figure 5:
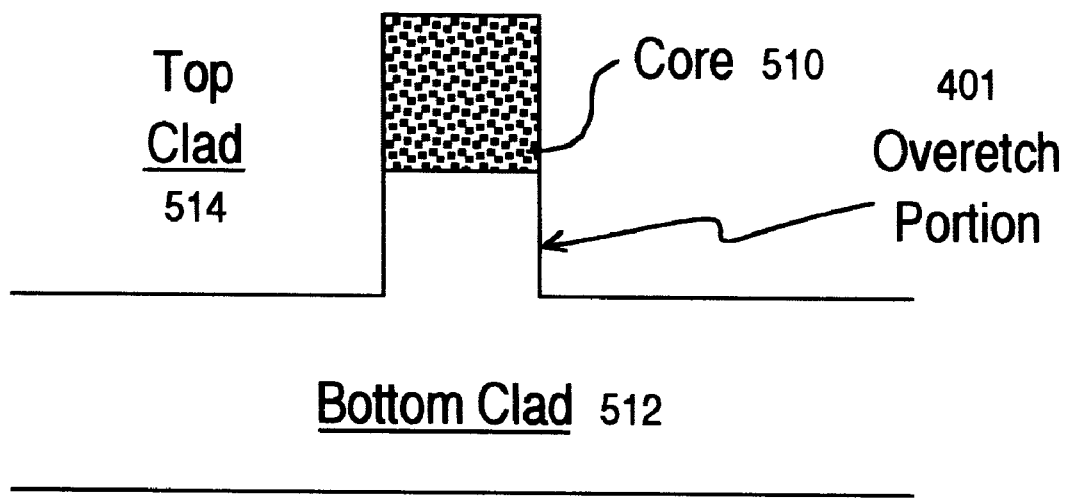
FIG. 5 shows a cross section view of an optical waveguide structure including a top clad layer and a bottom clad layer surrounding a core.

A top cladding layer is then formed over the optical core 310 and the bottom clad 312. As is well known, the cladding layer has a lower refractive index than the optical core 310. FIG. 5 shows an optical waveguide structure 500 after a top clad 514 has been formed.

Figure 4:
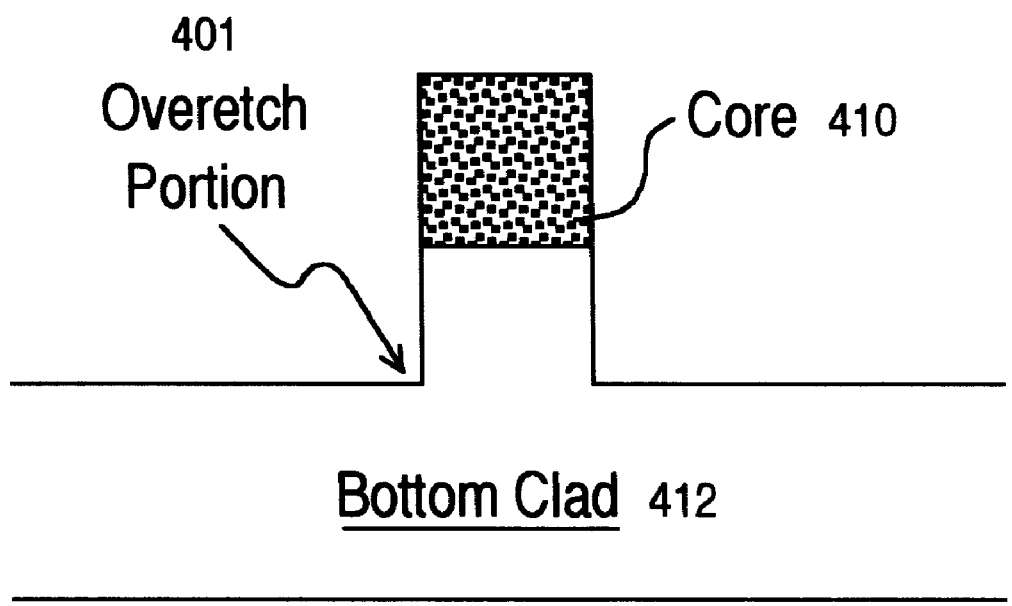
FIG. 4 shows a cross-section view of an optical waveguide structure having a larger over-etch portion in comparison to the optical waveguide structure from FIG. 3.

FIG. 4 shows an optical waveguide structure 400 having a larger over-etch portion 401 in comparison to the optical waveguide structure 300 from FIG. 3. As depicted in FIG. 4, the optical waveguide structure 400 includes an optical core 410 and a bottom clad 412 having an over-etch portion 401.

As described above, the amount of the portion of the substrate removed during the over-etching (e.g., over-etch portion 401) can be determined to minimizes the polarization dependent wavelength shift and the polarization dependent loss of the optical waveguide structure. Optical waveguide structure 400 depicts a case where the percent over-etch is close to 25 percent, wherein optical waveguide structure 300 depicts a case where percent over-etch is close to 7.5 percent.

It should be noted that the Figures (e.g., FIGS. 2–5) are intended to be schematic to illustrate the principles of the present invention. As such, the Figures may be dimensionally exaggerated in order to illustrate aspects of the embodiments.

FIG. 5 shows an optical waveguide structure 500 including a top clad 514. The top clad layer 514, as with bottom clad 512, is formed with a lower refractive index than the core 510. Consequently, optical signals are confined axially within core 510 and propagate lengthwise through core 510.

Figure 6:
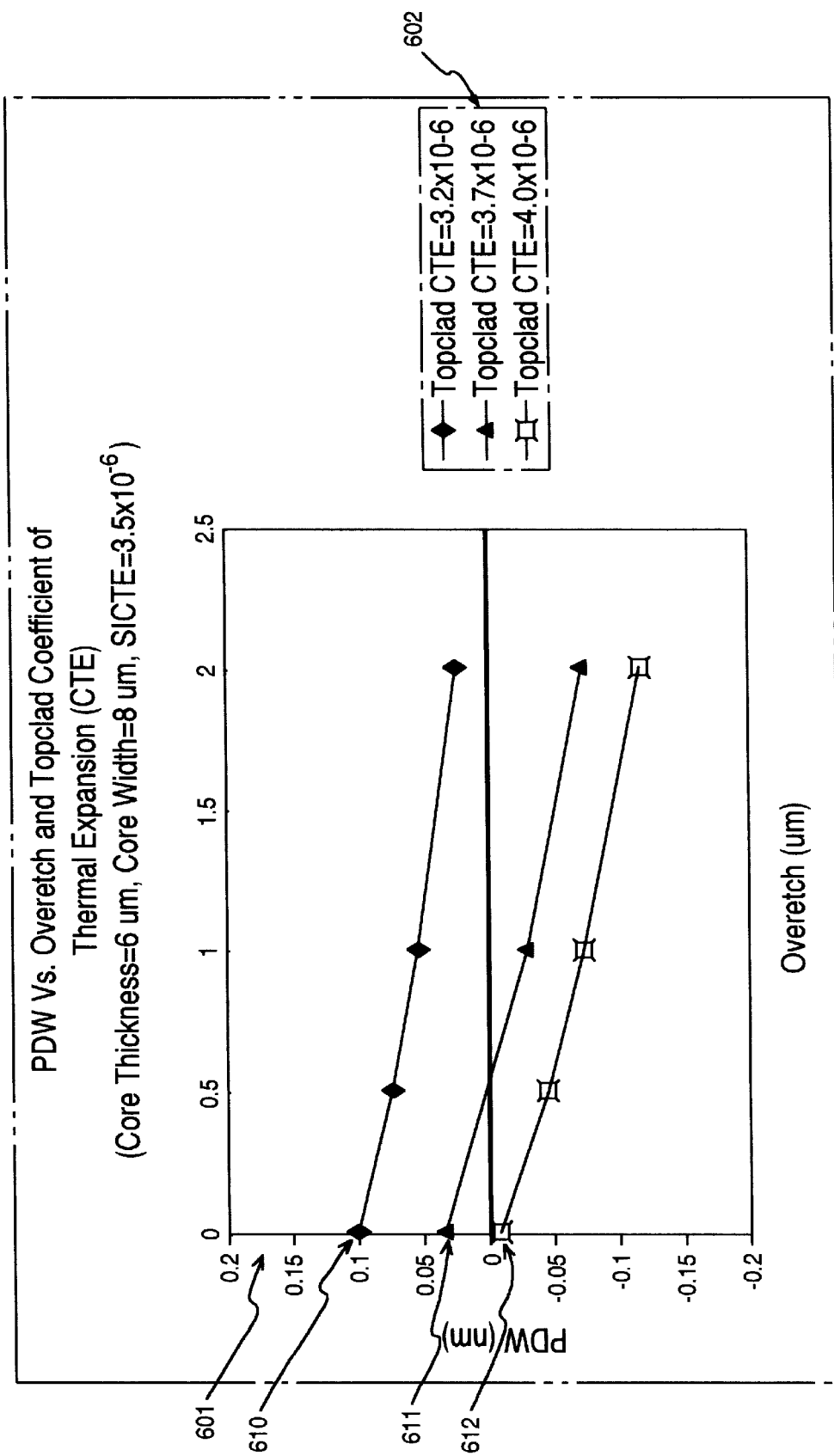
FIG. 6 shows a graph showing modeling results using Finite Element Analysis that correlate phase dependent wavelength shift of a planar lightwave circuit fabricated to the amount of over-etch used in the fabrication.

Referring now to FIG. 6, a graph 601 showing Finite Element Modeling results that correlate phase dependent wavelength shift of a planar lightwave circuit fabricated in accordance with the present invention to the amount of over-etch used in the fabrication is shown. FIG. 6 also shows a legend 602 corresponding to the graph 601.

Three traces 610–612, are shown on graph 601. As shown by legend 602, trace 610 shows the modeling results for phase dependent wavelength shift vs. amount of over-etch for a top clad (Coefficient of Thermal Expansion (CTE)= $3.2 \times 10^{-6}$ 1/C) with blanket stress equal to 12 MPa. Trace 611 shows the modeling results for a top clad (Coefficient of Thermal Expansion (CTE)=$3.7 \times 10^{-6}$ 1/C) with a blanket stress equal to 8 MPa. Trace 612 shows the modeling results for a top clad (Coefficient of Thermal Expansion (CTE)= $4.0 \times 10^{-6}$ 1/C) with a blanket stress equal to 20 MPa. All cases are with a core thickness of 6.0 microns, a core width of 8.0 microns, and a Si substrate CTE of $3.5 \times 10^{-6}$ 1/C. In each case, it should be noted that the polarization dependent wavelength shift tends to vary linearly with respect to the amount of over-etch. This holds true for different CTE values and for different blanket stress values. For example, trace 611 shows minimum phase dependent wavelength shift at an over-etch amount of 0.5 microns. In contrast, trace 610 shows a minimum phase dependent wavelength shift at an amount greater than 2.0 microns. In each case, the objective is to determine the proper amount of over-etch that yields the minimum phase dependent wavelength shift.

It should be noted that the modeling results shown in FIG. 6 are obtained through numerous computer simulation runs. Accordingly, many different sets of variables (e.g., CTE, blanket stress, percent over-etch, and the like) can be examined in order to determine the correct amount of over-etch for a given fabrication process and a given planar lightwave circuit.

Figure 7:
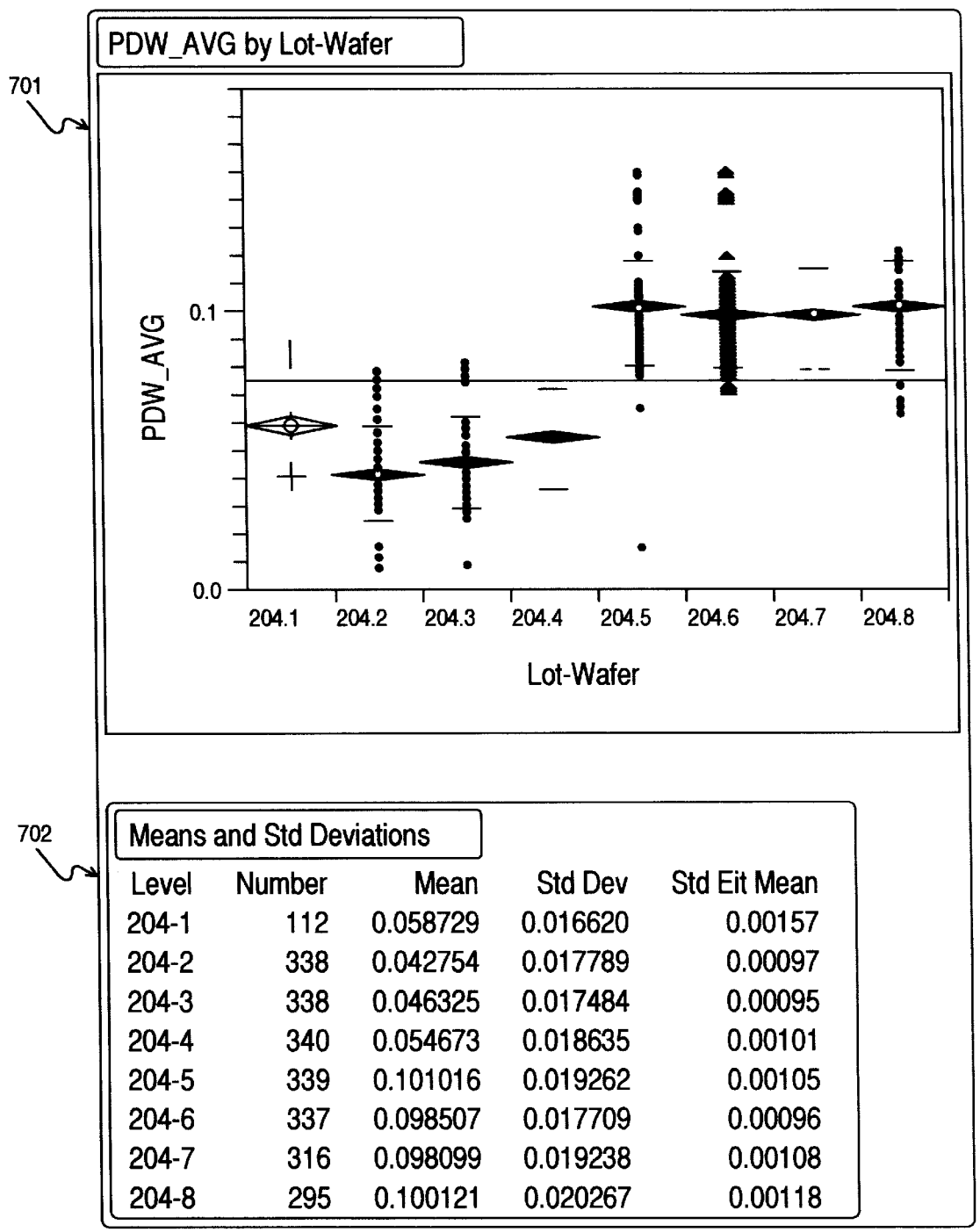
FIG. 7 shows a graph showing experimental results for a set of wafers having been processed in accordance with the present invention.

Referring now to FIG. 7, a graph 701 showing experimental results for a set of wafers having been processed in accordance with the present invention. As with FIG. 6, the graph 701 and a corresponding legend 702 showing the correlation between phase dependent wavelength shift of a planar lightwave circuit and the amount of over-etch used. Graph 701 of FIG. 7 shows actual empirical results of test wafers.

The vertical axis a graph 701 shows the average polarization dependent wavelength shift. Each of the test wafers (e.g., 204-1 through 204-8) is shown across the horizontal axis of graph 701. Each wafer includes a number of planar lightwave circuits (e.g., 12 or more AWG multiplexers) and each circuit includes 32 or more optical waveguides. The polarization dependent wavelength shift of each optical waveguide of each wafer is measured and charted on graph 701. The numerous measurements comprise the "measurement lines" above each wafer number on graph 701. The diamond on the measurement line shows the mean and statistical distribution of the polarization dependent wavelength shift for the wafer. The upper and lower horizontal lines on each measurement line show the standard deviation for the wafer. Legend 702 provides the measured statistics for each wafer.

Figure 8:
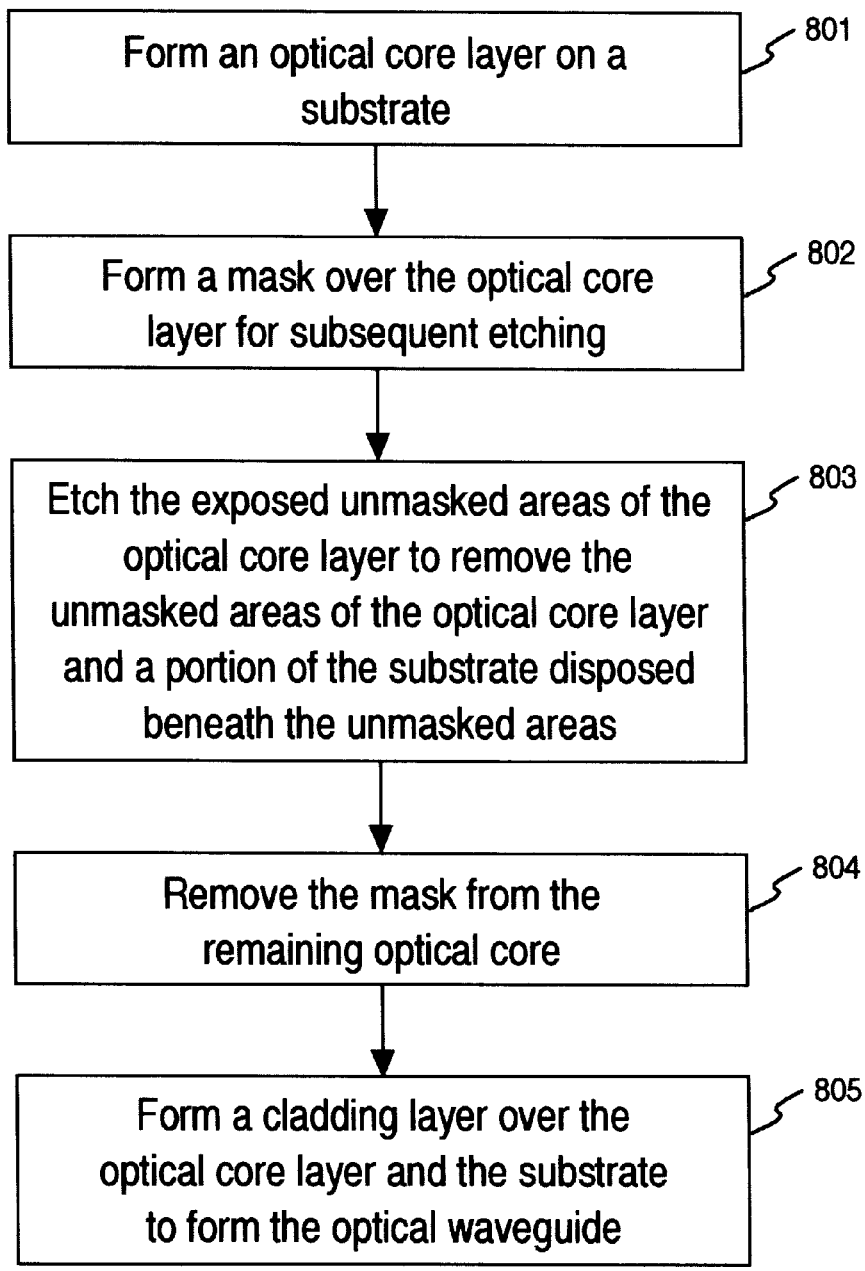
FIG. 8 shows a flow chart of the steps of a planar lightwave circuit fabrication process in accordance with one embodiment of the present invention.

FIG. 8 shows a flow chart of the steps of a planar lightwave circuit fabrication process 800 in accordance with one embodiment of the present invention. As depicted in FIG. 8, process 800 shows the steps of an over-etch fabrication process for planar lightweight circuits.

Process 800 begins in step 801, where an optical core layer is formed on a substrate. The optical core layer comprises doped $SiO_2$ glass layer having higher refractive index than the $SiO_2$ substrate. In step 802, a mask is formed over the optical core layer for subsequent patterning. In step 803, the exposed unmasked areas of the optical core layer undergo etching to define the core, wherein the over-etching removes the unmasked area of the optical core layer and a portion of the substrate disposed beneath the unmasked area. As described above, the amount of the substrate removed, or the percent over-etch, is precisely calibrated in order to yield an optimal polarization dependent wavelength shift for the devices on the wafer. In step 804, the mask is removed from the optical core. Subsequently in step 805, a cladding layer (e.g., typically $SiO_2$) is formed over the optical core and the substrate. As described above, the top cladding layer has a lower refractive index than the optical core.

Thus, the embodiments of the present invention are directed towards an optical core layer over-etch optical waveguide structure fabrication process that matches the TE and TM propagation modes of an optical signal within a planar lightwave circuit. The present invention provides a solution that minimizes polarization dependent wavelength shift within a planar lightwave circuit. Additionally, the solution of the present invention minimizes polarization dependent loss within a planar lightwave circuit and significantly increases the performance of high-precision optical devices such as AWG demultiplexers/multiplexers.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain.the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method of making a polarization insensitive optical waveguide structure, the method comprising the steps of:
   a) forming an optical core layer on a substrate, the optical core layer having a higher refractive index than the substrate;
   b) forming a mask over the optical core layer;
   c) over-etching an unmasked area of the optical core layer to define an optical core, wherein the over-etching removes the unmasked area of the optical core layer and a portion of the substrate disposed beneath the unmasked area of the optical core layer, and defines the optical core;
   d) removing the mask from the optical core; and
   e) forming a cladding layer over the optical core and the substrate, the cladding layer having a lower refractive index than the optical core, to form a polarization insensitive optical waveguide structure.

2. The method of claim 1 further including the step of controlling the amount of over-etching in step c) to control an amount of substrate disposed beneath the unmasked area of the optical core layer that is removed, wherein the amount of substrate removed controls the polarization sensitivity of the optical waveguide structure.

3. The method of claim 1 wherein the portion of the substrate removed in step c) minimizes the polarization dependent wavelength shift of the optical waveguide structure.

4. The method of claim 1 wherein the portion of the substrate removed in step c) minimizes the polarization dependent loss of the optical waveguide structure.

5. The method of claim 1 further including the step of controlling the portion of the substrate removed in step c) in accordance with a blanket stress of the cladding layer.

6. The method of claim 1 wherein the over-etching from step c) is within a range between 7.5 percent and 30 percent.

7. A method of making an optical waveguide for a phase insensitive planar lightwave circuit, the method comprising the steps of:
   a) forming a bottom cladding on a silicon substrate;
   b) forming an optical core layer on the bottom cladding, the optical core layer having a higher refractive index than the bottom cladding;
   c) forming a mask over the optical core layer;
   d) over-etching an unmasked area, wherein the over-etching removes the unmasked area of the optical core layer and a portion of the bottom cladding disposed beneath the unmasked area of the optical core layer;
   e) removing the mask from the optical core; and
   f) forming a top cladding over the optical core and the bottom cladding to form an optical waveguide of a planar lightwave circuit.

8. The method of claim 7 further including the step of using an amount of over-etching in step d) to remove an amount of bottom cladding disposed beneath the unmasked area of the optical core layer, wherein the amount of substrate removed controls the polarization sensitivity of the optical waveguide.

9. The method of claim 7 wherein the portion of the bottom cladding removed in step d) minimizes the polarization dependent wavelength shift of the optical waveguide.

10. The method of claim 7 wherein the portion of the bottom cladding removed in step d) minimizes the polarization dependent loss of the optical waveguide.

11. The method of claim 7 further including the step of determining the amount of the portion of the bottom cladding removed in step d) in accordance with a blanket stress of the top cladding.

12. The method of claim 7 wherein the over-etching from step d) is within a range between 7.5 percent and 30 percent over-etch.

13. A method of making an AWG (arrayed waveguide grating) planar lightwave circuit, the method comprising the steps of:
   a) forming a bottom cladding on a substrate;
   b) forming an optical core layer on the bottom cladding, the optical core layer having a higher refractive index than the bottom cladding;
   c) over-etching the optical core layer, wherein the over-etching removes unmasked areas of the optical core layer and a portion of the bottom cladding disposed beneath the unmasked area of the optical core layer; and
   e) forming a top cladding over the optical core and the bottom cladding to form an optical waveguide of an AWG planar lightwave circuit.

14. The method of claim 13 further including the step of using an amount of over-etching in step c) to remove an amount of bottom cladding disposed beneath the unmasked area of the optical core layer, wherein the amount of substrate removed controls the polarization sensitivity of the optical waveguide.

15. The method of claim 13 wherein the portion of the bottom cladding removed in step c) minimizes the polarization dependent wavelength shift of the optical waveguide.

16. The method of claim 13 wherein the portion of the bottom cladding removed in step c) minimizes the polarization dependent loss of the optical waveguide.

17. The method of claim 13 further including the step of determining the amount of the portion of the bottom cladding removed in step c) in accordance with a blanket stress of the top cladding.

18. The method of claim 13 wherein the over-etching from step c) is within a range between 7.5 percent and 30 percent over-etch.

* * * * *